(12) United States Patent
Yu et al.

(10) Patent No.: US 10,776,588 B2
(45) Date of Patent: Sep. 15, 2020

(54) SMARTPHONE-BASED TELEPHONE TRANSLATION SYSTEM

(71) Applicant: SHENZHEN ZHIYUAN TECHNOLOGY CO., LTD., Shenzhen (CN)

(72) Inventors: Liang Yu, Shenzhen (CN); Chuan Wang, Shenzhen (CN)

(73) Assignee: SHENZHEN ZHIYUAN TECHNOLOGY CO., LTD., Shenzhen (CN)

( * ) Notice: Subject to any disclaimer, the term of this patent is extended or adjusted under 35 U.S.C. 154(b) by 169 days.

(21) Appl. No.: 16/043,104

(22) Filed: Jul. 23, 2018

(65) Prior Publication Data

US 2019/0347331 A1 Nov. 14, 2019

(30) Foreign Application Priority Data

May 9, 2018 (CN) .......................... 2018 1 0439215

(51) Int. Cl.
| | |
|---|---|
| *G06F 17/28* | (2006.01) |
| *H04L 29/06* | (2006.01) |
| *H04M 3/51* | (2006.01) |
| *G06F 40/58* | (2020.01) |
| *G10L 13/04* | (2013.01) |
| *G10L 15/22* | (2006.01) |

(Continued)

(52) U.S. Cl.
CPC ............ *G06F 40/58* (2020.01); *G10L 13/043* (2013.01); *G10L 15/22* (2013.01); *G10L 15/265* (2013.01); *H04M 1/6033* (2013.01)

(58) Field of Classification Search
CPC ........ G06F 17/28; G06F 17/289; G06F 3/167; H04L 63/1433; H04L 29/06; H04L 51/10; G06Q 20/12; H04M 3/5307; H04M 3/5166
See application file for complete search history.

(56) References Cited

U.S. PATENT DOCUMENTS

| | | | |
|---|---|---|---|
| 9,432,516 B1 * | 8/2016 | Barbulescu | H04H 20/82 |
| 10,089,305 B1 * | 10/2018 | Hodge | H04M 3/42 |
| 10,417,349 B2 * | 9/2019 | Lewis | G06F 40/58 |

(Continued)

FOREIGN PATENT DOCUMENTS

CN 107734160 A 2/2018

*Primary Examiner* — Anne L Thomas-Homescu
(74) *Attorney, Agent, or Firm* — Im IP Law; Chai Im; C. Andrew Im

(57) ABSTRACT

A smartphone-based telephone translation system includes a translation machine that starts a call translation process when the call translation is set to ON. The system detects an incoming call or dials, translates a voice signal to obtain a translation text for the ON call state. The voice signal of the caller is received and recognized. A voice signal is translated to obtain a translation text for the ON call state. The localized voice signal is recognized, using a TTS machine to obtain a reply voice signal and sent to the caller. The system performs voice recognition and text translation on the call voice, translates the language into localized language, and performs the function of calling between different languages in real time, so as to realize a telephone communication between two persons speaking different languages. The system supports communication with a hearing-impaired person or deaf-mute person.

9 Claims, 2 Drawing Sheets

(51) Int. Cl.
*G10L 15/26* (2006.01)
*H04M 1/60* (2006.01)

(56) References Cited

U.S. PATENT DOCUMENTS

| | | | |
|---|---|---|---|
| 2007/0244687 A1* | 10/2007 | Mizutani | G10L 15/22 704/1 |
| 2010/0222098 A1* | 9/2010 | Garg | H04M 1/72552 455/556.1 |
| 2012/0123765 A1* | 5/2012 | Estelle | G06F 40/44 704/3 |
| 2013/0289971 A1* | 10/2013 | Parkinson | G10L 15/26 704/2 |
| 2013/0339025 A1* | 12/2013 | Suhami | H04R 25/00 704/271 |
| 2014/0164476 A1* | 6/2014 | Thomson | G06Q 10/101 709/203 |
| 2014/0269678 A1* | 9/2014 | McGee | G06F 40/58 370/352 |
| 2015/0057994 A1* | 2/2015 | Fang | H04W 4/14 704/4 |
| 2015/0134322 A1* | 5/2015 | Cuthbert | G06F 40/58 704/3 |
| 2015/0149560 A1* | 5/2015 | Lee | H04L 51/066 709/206 |
| 2015/0281445 A1* | 10/2015 | Kumar | H04M 3/5166 379/88.01 |
| 2015/0288797 A1* | 10/2015 | Vincent | H04W 4/90 455/404.2 |
| 2015/0347399 A1* | 12/2015 | Aue | H04M 3/42 704/2 |
| 2015/0350451 A1* | 12/2015 | Aue | H04M 3/42 379/202.01 |
| 2016/0117315 A1* | 4/2016 | Lu | G06F 40/263 704/2 |
| 2016/0170970 A1* | 6/2016 | Lindblom | G06F 40/40 704/3 |
| 2016/0210602 A1* | 7/2016 | Siddique | G06Q 20/0453 |
| 2016/0248785 A1* | 8/2016 | Petry | H04L 67/02 |
| 2016/0309033 A1* | 10/2016 | Woolsey | H04M 3/42382 |
| 2017/0180413 A1* | 6/2017 | Petry | H04L 63/0209 |
| 2017/0330471 A1* | 11/2017 | Subiakto | G06F 3/165 |
| 2018/0052826 A1* | 2/2018 | Chowdhary | G06F 40/58 |
| 2018/0052831 A1* | 2/2018 | Ahn | H04N 7/15 |
| 2018/0131642 A1* | 5/2018 | Trufinescu | H04L 51/02 |
| 2018/0211509 A1* | 7/2018 | Ramaci | G08B 5/36 |
| 2019/0036856 A1* | 1/2019 | Bergenlid | G10L 15/22 |
| 2019/0156821 A1* | 5/2019 | Zamora Duran | G10L 15/24 |
| 2019/0205396 A1* | 7/2019 | Gubanov | G06F 40/51 |
| 2019/0235832 A1* | 8/2019 | Pallakoff | G06F 3/0482 |
| 2019/0311714 A1* | 10/2019 | Barbello | G10L 15/005 |
| 2020/0026766 A1* | 1/2020 | Ji | G06F 40/44 |

* cited by examiner

SMARTPHONE-BASED TELEPHONE TRANSLATION SYSTEM

RELATED APPLICATION

The present application claims the benefit of the Chinese patent application CN201810439215.1 filed May 9, 2018, which is incorporated herein by reference in its entirety.

FIELD OF THE INVENTION

The present invention belongs to the field of internet technology, in particular, to a smartphone-based telephone translation system.

BACKGROUND OF THE INVENTION

Current smartphone translation software (or translation machines) have many deficiencies when translating;

First of all, the two sides of the communication must have a face-to-face voice conversation, and the two sides frequently alternately speak to the microphone of the same machine, causing a lot of inconvenience.

Second, existing translation software (or translation machines) cannot implement real-time voice or text translation of the translation machine to any call terminal (including landline telephones). Real-time calls or text translations (including recording voice and text) cannot be made to incoming or outgoing calls.

Existing translation software (or translation machines) cannot help a hearing-impaired person or deaf-mute person to communicate or translate on the phone.

OBJECTS AND SUMMARY OF THE INVENTION

In view of the deficiencies in the prior art, the present invention provides a smartphone-based telephone translation system capable of performing a call between different languages in real time and assisting a hearing-impaired person or deaf-mute person to conduct a telephone communication.

1. A smartphone-based telephone translation system, comprising at least one translation machine;

the translation machine comprises a processor, an input device, an output device and a memory that are connected with each other, wherein the memory is used to store a computer program which includes program instructions and the processor is configured to call the program instructions for performing steps of:

starting a call translation process when the state of call translation is ON and the system detects an incoming call or dials;

the call translation process includes:

translating a voice signal to obtain a translation text if the call is in the ON state and the voice signal of the caller is received and recognized, and displaying;

translating a voice signal to obtain a translation text if the call is in the ON state and the localized voice signal is recognized, and displaying; based on the translation text, using a Text-to-Speech (TTS) machine for pronouncing to obtain a reply voice signal and sending the reply voice signal to the caller.

Further, the system also comprises a server;

the processor is also configured to, after receiving and recognizing a voice signal, call the program instructions for performing steps of:

sending the received and recognized voice signal to the server; receiving a translation text returned by the server;

the server is used to receive a speech signal from a translation machine, translate the voice signal to obtain a translation text, and send the translation text to the translation machine.

Further, translating the voice signal to obtain a translation text specifically includes:

performing a voice recognition on a voice message to obtain an original text;

performing a text translation on the original text to obtain the translation text.

Further, the processor is also configured to call the program instructions for performing steps of:

recording a call time, a call duration, a call recording, an original text, and a translation text.

Further, the translation machine obtaining the translation text and displaying specifically includes:

the translation machine displaying the original text and the translation text.

Further, the processor is also configured to call the program instructions for performing steps of:

receiving a setting instruction from the user to set a call translation interface to be opened when an incoming call or dialing is detected;

popping up the call translation interface to start the call translation process when an incoming call or dialing is detected.

Further, the processor is also configured to call the program instructions for performing steps of:

receiving an input instruction from the user to obtain a text message input by the user through a text input box set on the call translation interface.

Further, the processor is also configured to call the program instructions for performing steps of:

receiving a switching instruction from the user to switch the call translation state to a normal call state.

Further, the processor is also configured to call the program instructions for performing steps of:

receiving a query instruction from the user to inquire a translated voice message or text message;

receiving a repeated transmission instruction from the user to select a translated voice signal or a translated text for transmitting to the other side;

receiving a repeated listening instruction from the user to listen to a translated voice signal.

Further, the processor is also configured to call the program instructions for performing steps of:

receiving a volume setting instruction from the user to adjust the translation machine to mute or use the speaker.

As can be seen from the above technical solutions, the present invention provides a smartphone-based telephone translation system, which creatively performs voice recognition and text translation on the call voice, translates the language into localized language, and can perform the function of calling between different languages in real time, so as to realize telephone communication between two persons with different languages. Thus, during the communication of a hearing-impaired person or deaf-mute person, other side's call content can be displayed through text and a reply message can be input through text input so as to assist the call communication between hearing-impaired person or deaf-mute persons.

BRIEF DESCRIPTION OF FIGURES

In order to clearly illustrate the embodiments of the present invention or the technical solution in the prior art, the drawings required for the description of the embodiments or the prior art will be briefly introduced hereafter. In all the drawings, the similar elements or parts are generally denoted with similar drawing marks. In the drawings, the elements and parts are not necessarily drawn in an actual proportion.

DETAILED DESCRIPTION OF THE EMBODIMENTS

The embodiments of technical solution of the present invention will be described in detail in connection with the attached drawings. The following embodiments only serve as examples to illustrate the technical solution of the invention and not be given to limit the scope of protection of the invention. It shall be noted that unless otherwise mentioned, all technical and scientific terms used herein have the same meaning as commonly understood by a person skilled in the art to which the invention belong.

The terms "comprising" and "including", when used in the specification and the claims, indicate the presence of the described features, the whole, the steps, the operation, the elements and/or components, but do not exclude one or more other features, integers, steps, operations, elements, components and/or the existence or addition of their collection.

It is also to be understood that the terms of the present invention is for the purpose of describing particular embodiments and is not intended to limit the invention. As used in the description of the present invention and the appended claims, unless the context clearly indicates otherwise, the singular form "a", "one" and "the" is intended to include the plural form.

Embodiment 1

Embodiment 1 provides a smartphone-based telephone translation system, comprising at least one translation machine 800;

Specifically, the translation machine 800 is used to implement the call function, including calling and being called. The translation machine 800 can communicate with another translation machine 800 or a normal telephone terminal 900. The translation machine 800 can implement active calling action as the calling side, and can also implement passive calling action as the called side.

Figure 1:
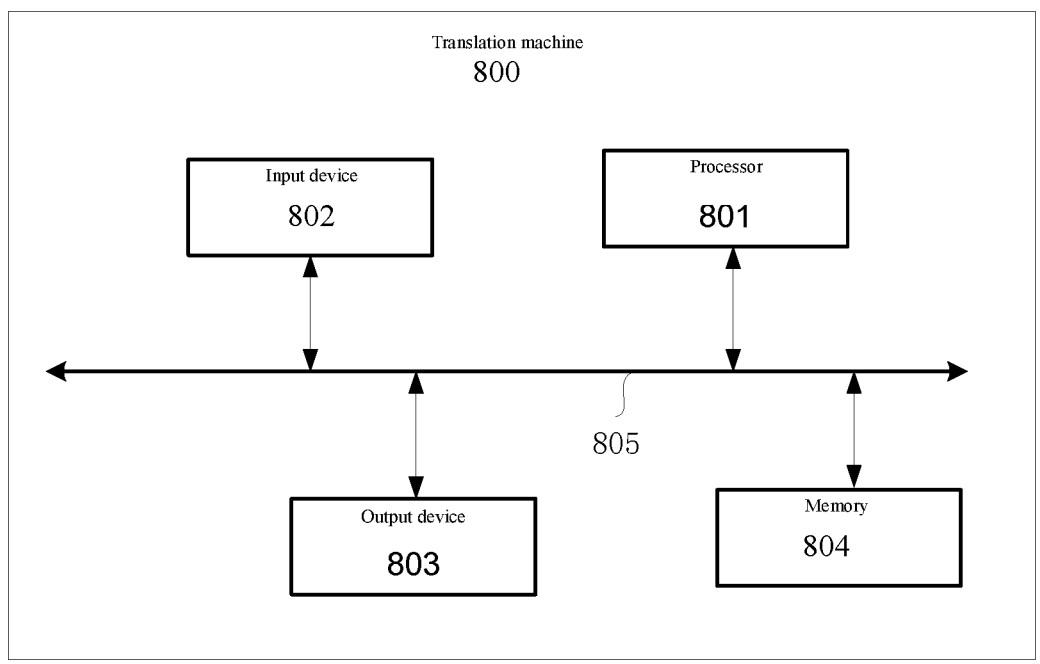
FIG. 1 is a modular block diagram of the translation machine provided in Embodiment 1.

With reference to FIG. 1, the translation machine 800 comprises a processor 801, an input device 802, an output device 803 and a memory 804 that are connected with each other by a bus 805, wherein the memory is used to store a computer program which includes program instructions and the processor is configured to call the program instructions for performing steps of:

starting a call translation process when the state of call translation is ON and the system detects an incoming call or dials;

specifically, the translation machine 800 may be provided with a monitor thread that is responsible for monitoring whether there is an incoming call or dialing. For example, the translation machine 800 monitors whether an incoming call from another terminal is received, or whether the translation machine 800 monitors whether there is a calling to another terminal.

The call translation process includes:

translating a voice signal to obtain a translation text if the call is in the ON state and the voice signal of the caller is received and recognized, and displaying;

specifically, the translation machine 800 is provided with an other-side recognition thread. When a voice from other side is monitored, the other-side recognition thread is started; when the other-side recognition thread picks up a voice signal of the other side, it translates the voice signal and translates into a text for displaying, so that a hearing-impaired person or deaf-mute person may view the call content.

A voice signal is translated to obtain a translation text if the call is in the ON state and the localized voice signal is recognized, and the text is displayed; based on the translation text, a TTS machine is used for pronouncing to obtain a reply voice signal and sending the reply voice signal to the caller.

Specifically, the translation machine 800 is provided with a local recognition thread. When a local voice is monitored, the local recognition thread is started; when the local recognition thread picks up the local voice signal, it translates the voice signal and translates into a text for displaying, so that a hearing-impaired person or deaf-mute person may view the call content. In addition, the local identification thread is also used to pronounce the translated text using a TTS machine, and then obtain the voice signal and send it to the other side. If the other side is a normal telephone terminal (such as a general mobile phone or a landline telephone), the other side can hear a voice message pronounced by the translation machine 800. If the other side is a translation machine 800, the voice message generated after the local translation machine 800 pronounces triggers the other-side recognition thread of the other side to start for receiving the sound from the local translation machine 800.

Specifically, if a deaf-mute person uses the translation machine 800, the pronunciation may not be conducted. Thus, a voice signal is translated to obtain a translation text if the call is in the ON state and the localized voice signal is recognized, and the text is displayed; based on the translation text, a TTS machine is used for pronouncing to obtain a reply voice signal and sending the reply voice signal to the caller. Then, the deaf-mute person can also make calls normally.

The system can meet the telephone communication between the hearing-impaired or the deaf-mute person, and can also meet the telephone communication between two users who use different voices with normal hearing and pronunciation.

If B is a translation machine 800, A is a general telephone terminal 900. When A speaks, A always sends out a voice signal. When B receives the sound of A, the other-side recognition thread starts to translate and translates into text message for displaying, then B may see the call content of A. When B replies, B sends a sound to trigger the local recognition thread to start for translating the voice signal and translating into a text message for displaying, and simultaneously the translation text is pronounced through the TTS for sending to A, then A may hear the sound of B. If B sends out a text message, the local identification thread starts to translate the text message and then to pronounce through the TTS for sending to A, thus A may also hear the sound of B, thereby realizing the normal communication between A and B.

If both A and B are translation machines 800. When A replies to the message, A's local identification thread starts to translate the voice message and then to pronounces through the TTS for sending to B, then B may also hear the sound of A, thereby realizing the normal communication between A and B. When A receives the voice signal from B, the other-side recognition thread starts to translate and translates into text message for displaying, then A may see the call content of B. Similarly, if A replies with text, A's local recognition thread starts to translate the text message and sends it to B through the TTS.

Specifically, the translation machine 800 implements translation between the two languages. For example, the translation between different languages such as Chinese and English may be implemented, and the communication between the hearing-impaired or the deaf-mute person may also be implemented. The deaf person realizes the communication function by replying to the text message and viewing the text message of the other side. The system may keep the calling on during the calling.

The system creatively performs voice recognition and text translation on the call voice, translates the language into localized language, and can perform the function of calling between different languages in real time, so as to realize telephone communication between two persons with different languages. Thus, during the communication of a hearing-impaired person or deaf-mute person, other side's call content can be displayed through text and a reply message can be input through text input so as to assist the call communication between hearing-impaired person or deaf-mute persons.

It should be understood that in the embodiments of the present invention, the processor 801 may be Central Processing Unit (CPU), and further may be other general purpose processors, Digital Signal Processor (DSP), Application Specific Integrated Circuit (ASIC), Field-Programmable Gate Array (FPGA) or other programmable logic devices, discrete gates or transistor logic devices, discrete hardware components, etc. The general purpose processor may be a microprocessor, or the processor may also be any conventional processors or the like.

The input device 802 may include a touch pad, a fingerprint sensor (for collecting fingerprint information of the user and direction information of the fingerprint), a microphone, and the like, and the output device 803 may include a display (LCD etc.), a speaker, and the like.

The memory 804 may include a read only memory and a random access memory, and provides instructions and data to the processor 801. A portion of the memory 804 may also include a non-volatile random access memory. For example, the memory 804 may also store information of the device type.

Embodiment 2

Figure 2:
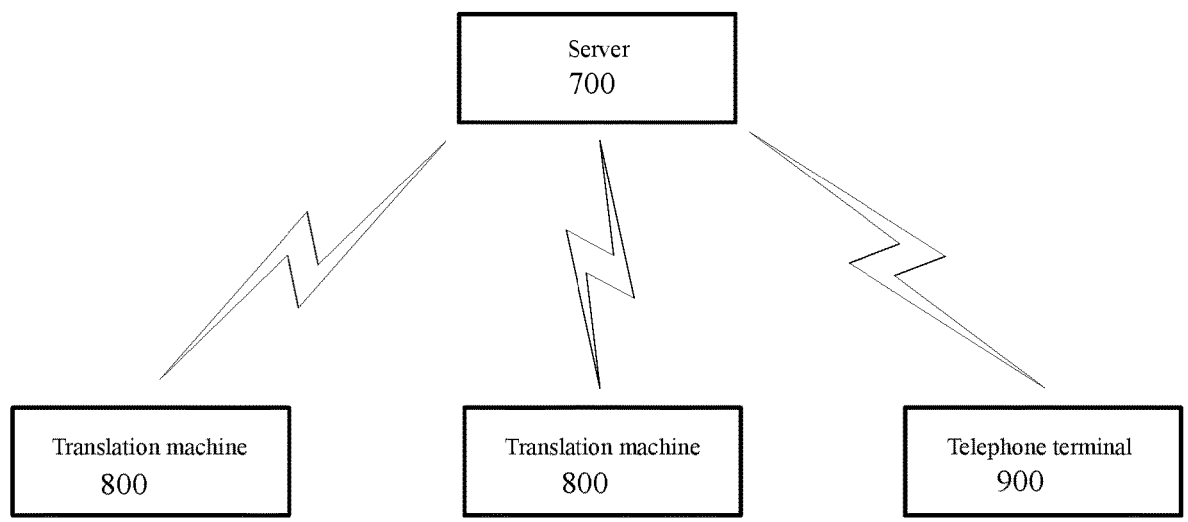
FIG. 2 is a modular block diagram of the system provided in Embodiment 2.

The system provided in Embodiment 2 adds the following content on the basis of the Embodiment 1:

With reference to FIG. 2, the system also comprises a server 700;

the processor is also configured to, after receiving and recognizing a voice signal, call the program instructions for performing steps of:

sending the received and recognized voice signal to the server 700; receiving a translation text returned by the server 700;

the server 700 is used to receive a speech signal from a translation machine 800, translate the voice signal to obtain a translation text, and send the translation text to the translation machine 800.

Specifically, the translation machine 800 of Embodiment 1 adopts offline translation, and may perform translation by the vocabulary built in the translation machine 800, so that the translated words are limited by the capacity of the lexicon, so the offline translation can only implement common basic translation. The translation machine 800 of the present embodiment provides an online translation function, wherein a voice signal is uploaded to the server 700 and the server 700 performs online translation on the network. Adopting the online translation method improves the accuracy of translation and may implement a voice recognition and text translation for more messages.

Further, translating the voice signal to obtain a translation text specifically includes:

performing a voice recognition on a voice message to obtain an original text;

performing a text translation on the original text to obtain the translation text.

Specifically, whether translation is performed on a translation machine 800 or on a server 700, the voice signal is first recognized as a text signal and translated into the corresponding language according to language requirements.

Further, the processor is also configured to call the program instructions for performing steps of:

recording a call time, a call duration, a call recording, an original text, and a translation text.

Specifically, both sides of the communication record the time of each call, the duration, the recording of the other side, the original text of the other side's call, the translation text of the other side, the local recording of the call, the local text of the call, and the local translation text of the call.

Further, the translation machine 800 obtaining the translation text and displaying specifically includes:

the translation machine 800 displaying the original text and the translation text.

Specifically, the original text and the translation text are displayed at the same time for the user to view.

For a brief description, in the system provided by the embodiments of the present invention, those that are not mentioned in the embodiments may refer to the corresponding content in the foregoing embodiments.

Embodiment 3

The system provided in Embodiment 3 adds the following content on the basis of other embodiments:

the processor is also configured to call the program instructions for performing steps of:

receiving a setting instruction from the user to set a call translation interface to be opened when an incoming call or dialing is detected;

specifically, the call translation interface is mainly used to facilitate the user to view the call message of both sides, and the call translation interface can display the text message of the two sides. If the user does not expect to display the call translation interface, the call translation interface may be closed, and closing the call translation interface may not affect the normal call with the call being not hanged.

The call translation interface is popped up to start the call translation process when an incoming call or dialing is detected.

Further, the processor is also configured to call the program instructions for performing steps of:

receiving an input instruction from the user to obtain a text message input by the user through a text input box set on the call translation interface.

specifically, the user may input a text message through the text input box to make a call.

Further, the processor is also configured to call the program instructions for performing steps of:

receiving a switching instruction from the user to switch the call translation state to a normal call state.

Specifically, when the call translation function is not required, the call state can be switched to the state of normal call to restore the normal call function.

Further, the processor is also configured to call the program instructions for performing steps of:

receiving a query instruction from the user to inquire a translated voice message or text message;

receiving a repeated transmission instruction from the user to select a translated voice signal or a translated text for transmitting to the other side;

receiving a repeated listening instruction from the user to listen to a translated voice signal.

Specifically, the translation machine 800 also has the ability to query and resend. The user can query the translated message, or resend the translated message, or listen to the translated voice message.

Further, the processor is also configured to call the program instructions for performing steps of:

receiving a volume setting instruction from the user to adjust the translation machine 800 to mute or use the speaker.

Specifically, if the user does not expect the pronouncing action, he can mute the device or set the volume of the speaker.

For a brief description, in the system provided by the embodiments of the present invention, those that are not mentioned in the embodiments may refer to the corresponding content in the foregoing embodiments.

At last, it should be illustrated that the above various embodiments are only used to illustrate the technical schemes of the present invention without limitation; and despite reference to the aforementioned embodiments to make a detailed description for the present invention, the ordinary technical personnel in this field should understand: the described technical scheme in above various embodiments can be modified or the part of or all technical features can be equivalently substituted; while these modifications or substitutions do not make the essence of their corresponding technical schemes deviate from the scope of the technical schemes of the embodiments of the present invention, all of which should be contained within the scope of the claims and description of the present invention.

What is claimed is:

1. A smartphone-based telephone translation system, comprising a first translation machine and a second translation machine, wherein:

the first translation machine comprises a first processor, a first input device, a first output device and a first memory that are connected with one another;

the first memory is used to store a computer program which includes first program instructions;

the first processor is configured to call the first program instructions for performing a step of starting a first call translation process for an ON call translation state;

the first translation machine detects an incoming call or dials;

the first call translation process includes:

translating a voice signal to obtain a translation text for the ON call translation state and the voice signal of the caller is received and recognized, and displayed;

displaying, based on the translation text, using a Text-to-Speech (TTS) machine for a pronunciation to obtain a reply voice signal; and sending the reply voice signal to the caller;

the second translation machine comprises a second processor, a second input device, a second output device, a second memory and a server that are connected with one another;

the second memory is used to store a computer program which includes second program instructions;

the second processor is configured to:

call the second program instructions for performing a step of starting a second call translation process for an ON call translation state;

after receiving and recognizing a voice signal, call the second program instructions for performing a step of sending the received and recognized voice signal to the server; and receive a translation text returned by the server;

the server is configured to receive a speech signal from a third translation machine, translate the voice signal to obtain a translation text, and send the translation text to the third translation machine;

the second translation machine detects an incoming call or dials;

the second call translation process includes:

translating a voice signal to obtain a translation text for the ON call translation state and the voice signal of the caller is received and recognized, and displayed;

displaying, based on the translation text, using a Text-to-Speech (TTS) machine for a pronunciation to obtain a reply voice signal; and sending the reply voice signal to the caller;

the first translation machine adopts offline translation, and performs translation by vocabulary built in the first translation machine;

the second translation machine provides an online translation function, wherein a voice signal is uploaded to the server and the server performs online translation on a network;

the first translation machine implements translation between Chinese and English;

the second translation machine implements translation between Chinese and English;

in response to the first translation machine's reply to a message, the first translation machine's local identification thread starts to translate the message and then pronounces through the TTS for sending to the second translation machine, then the second translation machine also hears the sound of the first translation machine, thereby realizing a normal communication between the first translation machine and the second translation machine;

in response to a reception of a voice signal from the second translation machine by the first translation machine, an other-side recognition thread starts to translate and translates into text message for displaying, then the first translation machine sees the call content of the second translation machine; and in response to a determination that the first translation machine's reply to the message is a text message, the first translation machine's local recognition thread starts to translate the text message and sends a translation of the text message to the second translation machine through the TTS.

2. The smartphone-based telephone translation system in claim 1, wherein, in the first translation machine, the step of translating the voice signal to obtain a translation text comprises steps of:

performing a voice recognition on a voice message to obtain an original text; and
performing a text translation on the original text to obtain the translation text.

3. The smartphone-based telephone translation system in claim 2, wherein the first processor is configured to call the first program instructions for performing a step of recording a call time, a call duration, a call recording, an original text, and a translation text.

4. The smartphone-based telephone translation system in claim 2, wherein the first translation machine is configured to display the original text and the translation text.

5. The smartphone-based telephone translation system in claim 1, wherein the first processor is configured to call the first program instructions for performing steps of:
    receiving a setting instruction from a user to open a call translation interface in response to a detection of an incoming call or dialing; and
    displaying the call translation interface to start the call translation process in response to the detection of the incoming call or dialing.

6. The smartphone-based telephone translation system in claim 5, wherein the first processor is configured to call the first program instructions for performing steps of receiving an input instruction from the user to obtain a text message inputted by the user through a text input box set on the call translation interface.

7. The smartphone-based telephone translation system according to claim 1, wherein the first processor is configured to call the first program instructions for performing a step of receiving a switching instruction from a user to switch the call translation state to a normal call state.

8. The smartphone-based telephone translation system in claim 1, wherein the first processor is configured to call the first program instructions for performing steps of:
    receiving a query instruction from a user to inquire a translated voice message or text message;
    receiving a repeated transmission instruction from the user to select a translated voice signal or translated text for transmission to other side; and
    receiving a repeated listening instruction from the user to listen to a translated voice signal.

9. The smartphone-based telephone translation system in claim 1, wherein the first processor is configured to call the first program instructions for performing a step of receiving a volume setting instruction from a user to adjust the first translation machine to mute or use a speaker.

* * * * *